O. PFENNINGER.
APPARATUS FOR COLOR PHOTOGRAPHY.
APPLICATION FILED NOV. 10, 1911.

1,066,526.

Patented July 8, 1913.

Witnesses.
Olive D White

Inventor.
Otto Pfenninger
Attorney.

UNITED STATES PATENT OFFICE.

OTTO PFENNINGER, OF BRIGHTON, ENGLAND.

APPARATUS FOR COLOR PHOTOGRAPHY.

1,066,526.  Specification of Letters Patent.  Patented July 8, 1913.

Application filed November 10, 1911. Serial No. 659,591.

*To all whom it may concern:*

Be it known that I, OTTO PFENNINGER, a citizen of the Swiss Republic, and residing at 105 Hythe road, Brighton, England, have invented a certain new and useful Apparatus for Color Photography, of which the following is a specification.

This invention relates to color photography, and more particularly to cameras of the kind proposed for obtaining a plurality of negatives for color photography at one exposure, in which an inclined colored transparent plate is inserted in the path of the rays from the lens, and reflects certain color components of the rays on to suitably placed sensitive media, and transmits the remainder on to a further sensitive medium.

The object of the present invention is to provide an improved method and apparatus of this nature, capable of producing more perfect images, and a truer rendering of color, with simplified procedure.

According to this invention, the reflecting element, instead of being inclined to the longitudinal axis, and to one of the transverse axes of the apparatus only, is inclined to the other transverse axis as well, whereby it appears from experimental investigation that the distortion of the image produced by the transmitted and therefore refracted rays in the known type of camera referred to, and which it has been proposed to overcome by the use of an additional inclined plate, either correcting the distortion, or producing a like distortion of the images produced by reflection, is overcome or rendered negligible, while at the same time the number of surfaces liable to lead to internal reflection is reduced to a minimum. Careful experiments which have been made show that provided care is taken to correct for the diminution in size and bodily displacement of the transmitted image (which is obtainable by focusing and suitable cross motion of the back plate carrier), there can readily be obtained by a camera constructed according to the present invention three negatives corresponding to the different color components which are to the eye capable of perfect registration, and from which color prints of greatly improved quality can be obtained.

According to the present invention also, an improved method of using a camera of this type, involving a rearrangement of the sensitive media, is obtained, which is described in detail by way of example hereafter, and which allows of great simplification of procedure in the obtaining of color photographs in such a manner.

Figure 1:
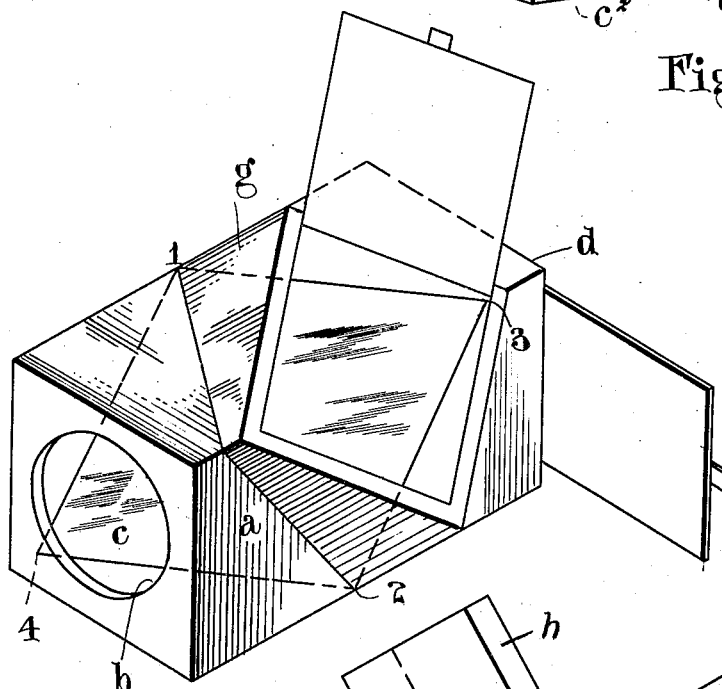

In the accompanying diagrammatic drawings—Figure 1 shows in perspective one form of apparatus according to this invention; and Figs. 2 to 6, other forms of improved apparatus.

Figure 2:
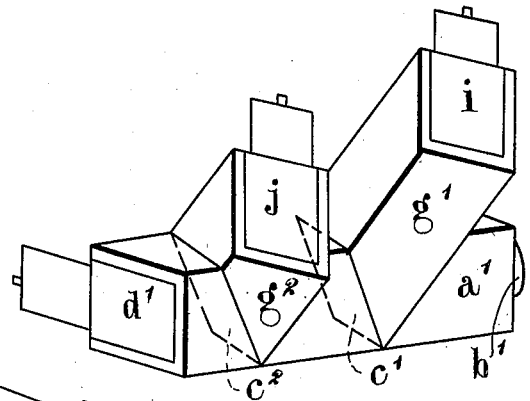

The heretofore unsatisfactory results obtained by the use of this type of camera have been apparently due to the fact that the transparent reflecting element necessarily produces a certain amount of refraction, and results in the distortion of the image on the sensitive plate, owing to a greater fore-shortening of the same in the vertical direction than in the horizontal direction. Fig. 1 shows a camera of this type, modified according to the present invention. A camera box $a$ has a lens opening $b$, and a reflector $c$, a suitable photographic plate being disposed at $d$, in an extension $g$ provided for the two other plates which can be placed in the usual way in the extremity thereof. The reflector $c$, however, instead of being disposed (as shown at $c'$ in dotted lines), as in the previously proposed form, is placed so as to be inclined to the longitudinal, and both transverse axes of the camera, it being so disposed that the line 1—2 is perpendicular to the longitudinal axis of the camera, and the line 3—4 is inclined at an angle of 45 degrees thereto. The axis of the extension $g$, in order that the reflected rays may impinge correctly upon the plates it carries, is inclined at equal angles to the sides from which the extension is built out. The above principle of construction may also be utilized in cameras in which a plurality of reflectors is employed. Thus, Fig. 2 shows such a camera in which the box $a'$ provided with a lens $b'$ has two extensions $g'$ and $g^2$, each adapted to take one of the plates, as at $i$ and $j$, and having as before a plate disposed at the back at $d'$. Two inclined reflectors $c'$ and $c^2$ are in this case employed, the first, $c'$, for example, being of a green tint, and the second, $c^2$, of a yellow tint. The reflectors are both inclined in the manner of that shown and described with reference to Fig. 1. It is to be observed that the extensions $g'$ and $g^2$ must be of such length that the distance traversed within the camera by the rays striking the plates $i$ and $j$ is equal, and also that this distance is substantially that traversed by the rays which strike the plate $d'$, in order that the images may be of equal size, and properly registering negatives obtained.

Figure 3:
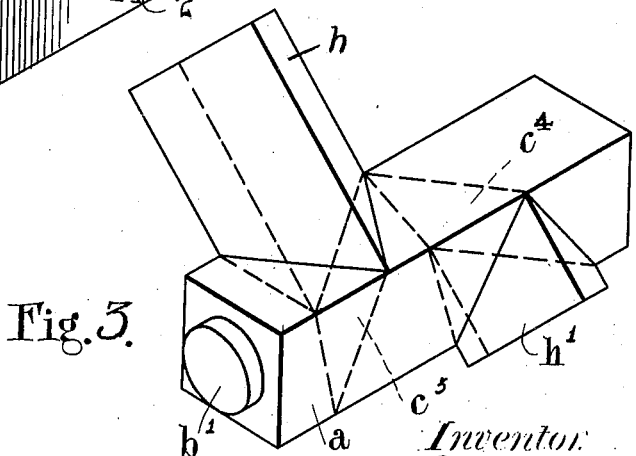

Fig. 3 shows a form of camera according to this invention, similar to that last described, but differing therefrom in that the extensions $h$ and $h'$ project on opposite sides of the camera box $a$, which involves that the reflectors $c^3$ and $c^4$ shall, as shown, be oppositely inclined.

Figure 4:
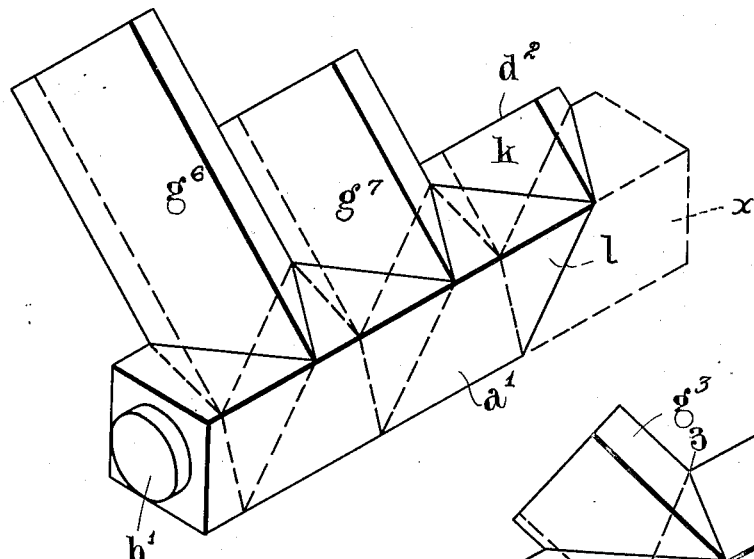

In Fig. 4 is shown a camera of the kind shown in Fig. 2, in which the plate $d^2$ is also placed at the end of an extension $k$, disposed perpendicularly to the axis of the camera box $a$, instead of projecting rearwardly as indicated in dotted lines at $x$, an ordinary reflector being provided at $l$, to cast the rays in the desired direction.

It has been proposed, in order to minimize the risks of direct light from the lens striking the upper plate of a camera, to incline the reflector at another angle than 45 degrees, for example, 60 degrees, which, involving an upward inclination of the upper plate away from the lens, e. g., 30 degrees to the horizontal axis of the camera, in the example referred to, tends to place the plate out of the path of straight light from the lens.

Figure 5:
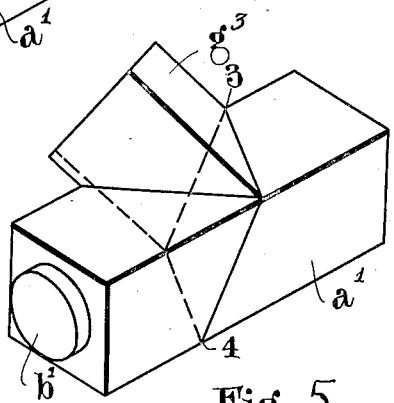

In Fig. 5 is shown a camera as shown in Fig. 1, but modified in this respect, the reflector being placed so that the line 3—4 makes a greater angle than 45 degrees with the longitudinal axis of the camera, and the extension $g^3$ is therefore constructed so that its axis is inclined at an equal angle with the reflector to that at which the longitudinal axis of the camera meets the reflector.

Figure 6:
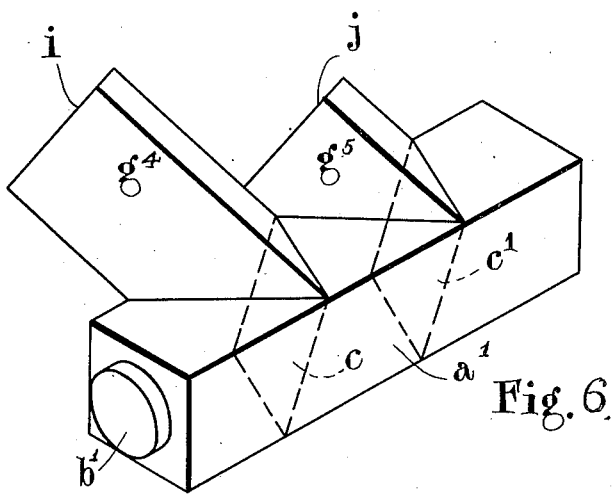

In Fig. 6 is shown a camera $a$ with lens $b$, reflectors $c$ and $c'$, extensions $g$ and $g'$, adapted to take plates at $i$ and $j$ as shown in Fig. 2, but modified in having the extensions $g$ inclined to the longitudinal axis of the camera $a$, instead of perpendicular thereto.

As above indicated, it is believed that the freedom from distortion in images obtained by the light transmitted through the reflector filter, where the same is arranged in the manner above indicated, is due to this positioning of the mirror, and in this way the provision of special compensating devices is rendered unnecessary.

Having now described my invention, what I claim as new and desire to secure by Letters Patent is:—

1. In a color photograph apparatus, the combination, with a camera box, of a filter inclined to the longitudinal axis of said box, and to both transverse axes of said box, a means for supporting sensitive plates mounted to receive the images transmitted by said filter and means for supporting sensitive plates in position to receive the images reflected from said filter.

2. In a color photograph apparatus, the combination, of a camera box having a lens orifice, a reflector filter and a plate holding device mounted on that axis of the box which passes through said lens orifice, the plane of said plate holding device being perpendicular to said axis, and said reflector filter being inclined to said axis, and to both transverse axes of said box.

3. A color photograph camera, including a substantially oblong camera box, a plate holding device in one extremity thereof, a transparent colored reflecting element disposed within said box, and in front of said plate holding device, said reflecting element being inclined to the longitudinal axis of the camera box, and to both of the transverse axes of the camera box, together with a plate holding chamber like extensions emerging from an edge of said oblong box, and adapted to receive light reflected from said reflecting element, as set forth.

In testimony whereof I have signed my name to this specification in the presence of two subscribing witnesses.

OTTO PFENNINGER.

Witnesses:
 BERTRAM H. MATTHEWS,
 GEO. TAPPINE, Jr.